May 31, 1966 P. M. COOK ETAL 3,253,619
HEAT RECOVERABLE REINFORCED ARTICLE AND PROCESS
Filed May 6, 1965
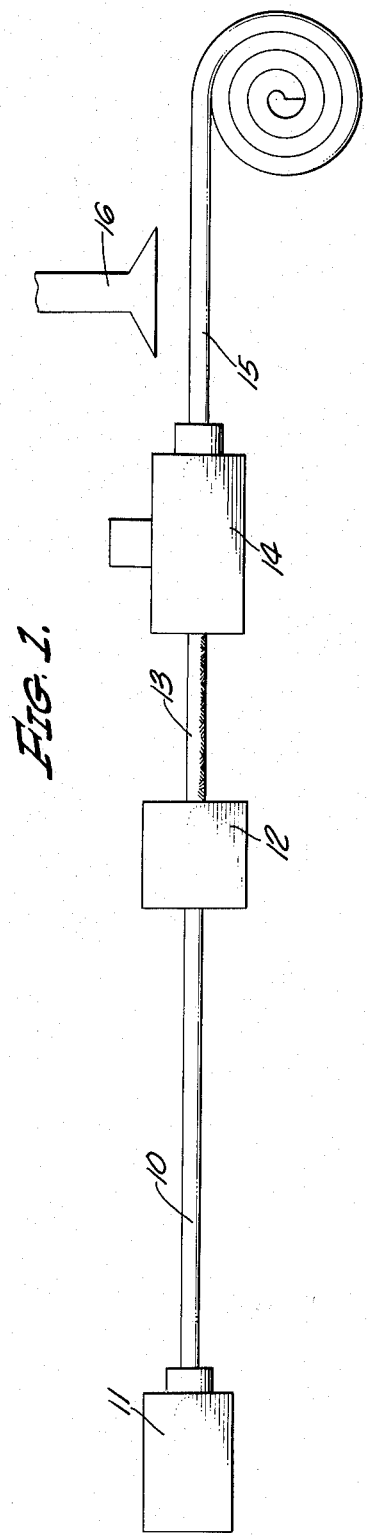
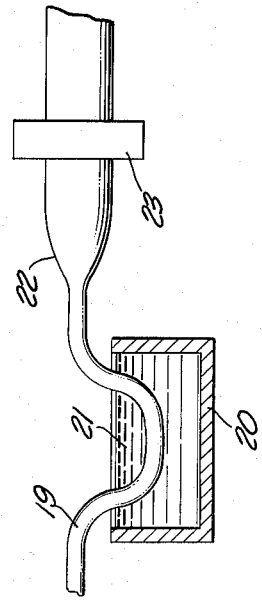
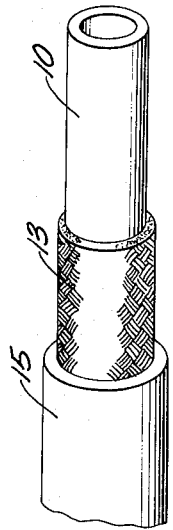
PAUL M. COOK
FRANK RAYMOND YOUNG
INVENTORS.
BY Lyon & Lyon
ATTORNEYS United States Patent Office 3,253,619
Patented May 31, 1966

3,253,619
HEAT RECOVERABLE REINFORCED ARTICLE
AND PROCESS
Paul M. Cook, Atherton, and Frank Raymond Young,
Menlo Park, Calif., assignors to Raychem Corporation,
Redwood City, Calif., a corporation of California
Filed May 6, 1965, Ser. No. 453,634
26 Claims. (Cl. 138—125)

This invention relates to heat shrinkable tubing and more particularly relates to such tubing having braided reinforcing. The tubing of the present invention is of the type made of material possessing the property of plastic or elastic memory, i.e., materials which are capable of changing dimension upon the application of heat. Many such materials are known, for example, those disclosed in Currie Patent No. 2,027,962 and Cook et al. Patent No. 3,086,242. Broadly, such materials may be defined as independently dimensionally heat unstable materials.

Although heat shrinkable sleeves constructed from elastic memory materials have been found useful for many purposes, their versatility could be greatly increased if their strength could be increased without any deleterious effects on their other necessary properties. Fiber reinforcement in such forms as matted strands have long been added to plastic and polymeric materials for the purpose of providing additional strengths. However, conventional fabric reinforcements are not always suitable for use in memory materials since they may substantially interfere with the desirable dimensional change of such materials. This is particularly true with regard to tubular articles which undergo a substantial change in radial dimension when exposed to heat. One satisfactory solution to this problem has been to use a knitted reinforcement as disclosed in application Serial No. 319,486, entitled "Reinforced Article and Process" filed October 28, 1963 by Paul M. Cook, the disclosure of which is incorporated by reference herein.

As discussed in the Cook application, there are various applications where it is important to minimize changes in the axial length of a heat recoverable article when the diameter is either expanded or shrunk. As pointed out in the Cook application, in these situations a braided reinforcement is not suitable. However, there are many other applications where this feature is either not of paramount importance or has no significance whatever. For example, in the making of insulated electrical connections, as disclosed for example in Wetmore application Serial No. 211,747 filed July 23, 1962, the disclosure of which is incorporated by reference herein, it is often of little or no importance that the insulating sleeve expands longitudinally when its diameter shrinks. The change in longitudinal dimension is also unimportant in the construction of reinforced conduits for carrying gases, fluids or electrical wiring. Furthermore, there are some applications where it would be definitely desirable to have the application of longitudinal tension on an article result in a reduction of its transverse dimension. For example, if an insulated electrical connection is to be subjected to tensional forces, tension induced reduction of transverse dimension would exert additional forces on the connected objects which would strengthen the connection.

It is therefore an object of the present invention to provide another solution to this problem, namely, to provide reinforcing for an article made of a memory material which does not undesirably interfere with the dimensional change of the memory material.

It is also an object of the present invention to provide an article constructed of reinforced memory material, the reinforcing being such that it will contribute to the strength of the article when it is subjected to tension or compression transverse to the axis.

It is another object of the present invention to provide a heat recoverable article having a braided reinforcement which will not unduly interfere with the expansion and recovery of the article.

It is a further object of the present invention to provide a process for making a reinforced article with the property of elastic memory.

These and other objects and advantages of the present invention will be apparent from the accompanying description and drawings in which:

FIGURE 1 is a schematic diagram of the process of reinforcing a tubular article according to the present invention;

FIGURE 2 is a perspective view, partly broken away, of a reinforced article according to the present invention; and FIGURE 3 illustrates a method of imparting the property of elastic memory to a reinforced article produced according to the present invention.

Briefly, the present invention relates to a heat recoverable article such as a tube which is provided with a braided reinforcing material that is capable of expanding and contracting in the transverse direction along with the memory material of which the article is constructed. The braided reinforcement may be provided on the inner surface, on the outer surface, or as an internal reinforcement. Furthermore, the reinforced article of the present invention may be combined with fusible members in the manner disclosed in the aforementioned Wetmore application, the disclosure of which application is incorporated herein by reference. Furthermore, the elastic memory material and/or the fusible member may be combined with the braided reinforcement by compound extrusion, for example, according to the method disclosed in Cook application Serial No. 228,300, filed October 4, 1962, the disclosure of which application is incorporated by reference herein, or by other known compound extrusion processes. In addition, the recoverable material and the braid reinforcement may be combined by impregnation, dipping, coating or any other suitable process.

The reinforcement which is used in the present invention may comprise a conventional braid. The braid may be applied in one or more layers as desired. The braid may comprise any suitable fiber material such as glass, metal, or a synthetic fiber, and may serve purposes other than reinforcement. For example, a metallic braid may serve as shielding for an electrical conductor, or could itself be used as a conductor, for example, in a coaxial cable which may be easily and conveniently made in accordance with the teachings of the present invention.

Although other methods can obviously be used, it has been found preferable to form the braided reinforcement as it is being applied to the elastic memory material. In a typical embodiment of the present invention, an inner tube or core is first extruded to specific dimensions. A braid is then installed over the inner tube so as to be snug to the tubing but not tight enough to distort its surface. An outer tube or jacket is then extruded over the braided inner tube. In the preferred embodiment of this invention, one or both of the core and jacket are capable of being crosslinked by either irradiation or chemical crosslinking. In such embodiment, the core and jacket are then subjected to irradiation and the sandwich construction is then expanded under heat and pressure to increase its diameter. Because of the nature of the braid, this expansion of the diameter of the sandwich tubing results in a reduction of its length. The article is then cooled in the expanded condition to produce an elastic memory material and is then ready for use. When again sufficiently heated, the tubing will shrink in its transverse dimension and elongate longitudinally.

Turning now to the drawings, FIGURE 1 illustrates a preferred process by which the articles of the present invention can be formed. As shown, the inner tube or core 10 is extruded by an extruder 11 and then passed to a braiding machine 12 which may be of any conventional type although Wardwell Braiding Equipment is preferred. It is important that the braid 13 be installed on the core 10 so as to be snug to the core but not tight enough to restrict its subsequent movement during expansion and recovery.

The core 10 and braid 13 are then passed through a second extruder 14 where an outer jacket 15 is extruded around the core and braid. If desired, an adhesive may be applied to the surface of inner core 10 in the manner disclosed in Cook application Serial No. 319,486. Broadly, such an adhesive will have a low resistance to the movement of the reinforcement and have substantially no tendency to lose viscosity to a degree such that it would be squeezed out of the reinforced article at a temperature sufficient to cause the heat recoverable material to change dimension. Care must be used in selecting the proper techniques and temperatures for this second extrusion so that the braid may subsequently have freedom of movement between the two tubes. After this second extrusion, the sandwich construction is then subjected to irradiation by any suitable source of irradiation 16, for example, two m.e.v. electron beam generator, to crosslink the two tubes. Alternatively, core 10 may be irradiated prior to installation of the braid 13. Of course, chemical crosslinking could also be used if desired.

The structure resulting from the process of FIGURE 1 is shown in FIGURE 2. As explained previously, the braid 13 is free to move relative to the inner tubing 10 and outer jacket 15. This is required because when the tubular article is subjected to heat and pressure and its diameter increased, the fibers of the braid must each be free to continuously move in an advancing helix around the core 10 in order for the braid to also expand in the transverse direction and contract in the longitudinal direction, this being necessary inasmuch as the strands or fibers themselves will often have substantially no give or stretch.

The material of which the braid is made depends, of course, upon the particular use to which the sandwich construction is to be put. The material can be nonmetallic such as glass or one of the synthetic fibers or it can be metallic, for example, stainless steel, cooper, brass, silver plated copper and brass, tin plated copper and brass, aluminum plated copper and brass, aluminum, and tin or silver plated aluminum. It has been found that the article of the present invention is capable of the maximum amount of radial change in dimension when the angle of the braid in the unexpanded condition relative to the axis of the tube is from about 5° to about 40° and that this angle should never exceed about 45°. Within these limits, it has been found that for comparable expansions, the angle may be increased with increase in diameter. The preferred angle is about 20°. When this angle is used, and the number of picks per inch is 8 in a tube having a diameter of 0.25 inch, it has been found that a 120% expansion in the radial direction may be obtained with a corresponding change in length of about 20%. When the angle is greater than about 45°, it has been found that expansion is not possible.

Turning now to FIGURE 3, there is shown a diagrammatic illustration of a reinforced tube 19 made in accordance with the process of FIGURE 1 being passed through a tank 20 which contains a heating liquid 21. A pressure source (not shown) may be used to exert internal pressure on tube 19 such that expansion takes place as indicated by numeral 22. It is desirable that the reinforced tube of the present invention be maintained in a relaxed or slack condition during expansion in order to minimize the pressure differential required for expansion. When the tube has expanded to the desired diameter, it is passed through cooling means 23 and cooled in the expanded condition while still under pressure. This expanded article may then be caused to assume its original dimensions by the application of sufficient heat. It is to be understood that any technique for imparting elastic memory to the article of the present invention may be used. A preferred technique is that disclosed in Cook et al. Patent No. 3,086,242. The tubing 19, when expanded, as at 22, will shrink longitudinally. When it is again heated to a temperature sufficient to cause recovery, it will elongate longitudinally together with contracting in diameter.

In a typical example of the process of the present invention, the inner tube or core 10 was a polyolefin tube approximately .144 inch in outside diameter and an inside diameter of .112 inch. This tube was then passed through Wardwell Braiding Equipment which installed a silver plated copper braid on the inner tube, the braid having an angle of 21° and 8 picks per inch. A second polyolefin tube with an inside diameter of approximately .150 inch was then installed over the braided assembly. One end of the completed assembly was then blocked off, the complete assembly was immersed in glycerine heated to about 275° F., allowed to remain there for about two minutes and air pressure then applied to the open end of the assembly which expanded it to about .297 inch in inside diameter. The assembly was then cooled while under pressure and the pressure removed, the tube remaining in its expanded state. When this assembly was again heated to about 275° F., it shrunk to a diameter of approximately .136 inch. It was noted that the expanded outside diameter of the product could be controlled by expanding it to the limits of the metal braid. When the tube was expanded to this point, it was noted that it was extremely strong.

Other tubes were prepared in the same manner with the exception that the dimensions of the tube, the braid angle and the picks per inch were varied. These tubes were then expanded and recovered and the results are set forth in the following table:

*Table*

| Sample | Core O.D. (inch) | Core I.D. (inch) | Braid Angle, degrees | Picks/ inch | Outer Tube I.D. (inch) | Expanded I.D. (inch) | Recovered I.D. (inch) |
| --- | --- | --- | --- | --- | --- | --- | --- |
| 1 | 0.206 | 0.156 | 15 | 3 | 0.225 | 0.600 | 0.156 |
| 2 | 0.206 | 0.156 | 30 | 7 | 0.225 | 0.312 | 0.156 |
| 3 | 0.500 | 0.430 | 30 | 7 | 0.500 | 0.545 | 0.420 |
| 4 | 1.450 | 1.360 | 50 | 7 | 1.500 | (1) | -------- |

[1] Sample could not be expanded.

As will be seen from the foregoing table, when the braid angle exceeded 45° in sample 4, the article could not be successfully expanded.

In general, the present invention contemplates providing a braided reinforcement to any heat recoverable material having the property of elastic or plastic memory, for example, the materials disclosed in Patents Nos. 2,027,962 and 3,086,242. Thus, included among the materials which may be reinforced according to the present invention are polymers, or admixtures or blends containing polymers selected from the group consisting of (1) crystalline polymers which exhibit elastomeric properties either at or about their crystal melting range, i.e., thermoplastic polymers and copolymers such as polytetrofluoroethylene, polychlorotrifluoroethylene, perfluorocarbon resin, high molecular weight polypropylene and polyethylene, etc. and (2) crystalline polymers and copolymers including polyolefins such as polyethylene and polypropylene, vinyls such as polyvinylchloride and polyvinylacetate and copolymers thereof, polyamides, polyesters, polyvinylidene fluoride, polyurethanes, heat shrinkable rubbers such as the silicone rubber and others disclosed in Cook application Serial No. 65,953, filed October 31, 1960, etc., which have been crosslinked by chemical methods or by irradiation. The crosslinking irradiation may be irradiation with high energy electrons, ultraviolet rays, atomic pile irradiation or other suitable irradiation.

The present invention, of course, may be applied to produce reinforced articles other than tubes. Caps, splice closures, etc., are among the structures which may be produced according to the present invention. A coaxial cable may also be easily constructed according to the principles of the present invention by inserting an uninsulated electrical conductor into a sandwich construction having a braid layer fabricated from a material having good electrical conductivity and then heat recovering the sandwich structure into firm engagement with the conductor. Thus, a coaxial cable may be produced in the field by shrinking the resulting article over a conductor. The reinforced elastic memory articles of the present invention may also be combined with fusible members in the manner disclosed in Wetmore application Serial No. 211,747, filed July 23, 1962. Thus, for example, the articles of the present invention may comprise a tubular elastic memory article having a braided reinforcement positioned on the outer surface, on the inner surface, or internally. In addition, any one of these reinforced articles may have a fusible insert on the inner, outer or both surfaces, thereof.

The invention may be embodied in other specific forms not departing from the spirit or central characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A heat recoverable article comprising a tube of independently dimensionally heat unstable material which is capable of changing dimension upon the application of heat alone to assume a predetermined configuration and a heat stable condition and a braided reinforcement which is coextensive with at least a portion of said tube, said reinforcement having an axis, and said axis of said reinforcement being at an angle of not more than 45° with the axis of the tube whereby the tube is capable of undergoing a substantial change in radial dimension.

2. The article of claim 1 wherein the reinforcement is positioned on the outer surface of said article.

3. The article of claim 1 wherein the reinforcement is positioned on the inner surface of said article.

4. The article of claim 1 wherein the reinforcement is positioned internally in said article.

5. The article of claim 1 wherein the reinforcement is positioned between two tubes of dimensionally heat unstable material.

6. The article of claim 1 wherein the angle of said braid relative to the axis of said article is between about 5° and 40°.

7. The article of claim 6 wherein the angle is about 20°.

8. The article of claim 1 wherein the angle of said braid relative to the axis of said article is at least about 5°.

9. The article of claim 1 wherein the braided reinforcement is of electrically conductive material.

10. The article of claim 6 wherein said braided reinforcement has about 8 picks per inch.

11. The article of claim 1 wherein said dimensionally unstable material has the property of elastic memory.

12. The article of claim 1 including a fusible member positioned on the surface of said heat unstable material within the direction of dimensional change of said dimensionally heat unstable material.

13. The article of claim 11 wherein said elastic memory material comprises an irradiated polymer.

14. The article of claim 11 wherein said elastic memory material comprises a chemically crosslinked polymer.

15. The article of claim 1 wherein said braided reinforcement is composed of substantially nonelastic fibers.

16. The article of claim 1 wherein said braided reinforcement is composed of glass fibers.

17. The article of claim 1 wherein said braided reinforcement is composed of electrically conductive fibers.

18. A process comprising applying a braided reinforcement to a tube of polymeric material, said reinforcement having an axis, and the axis of said reinforcement being at an angle of no greater than 45° to the axis of the tube whereby the tube is capable of undergoing substantial change in radial dimension and rendering said polymeric material independently dimensionally heat unstable such that it is capable of changing dimension upon the application of heat alone to assume a predetermined configuration and a stable condition.

19. The process of claim 18 wherein the angle of said braid relative to the axis of said tube is between about 5° and about 40°.

20. The process of claim 18 including the step of applying a fusible material to the surface of the article.

21. A process comprising extruding a first tube of polymeric material, applying a braided reinforcement to said first tube, extruding a second tube of polymeric material about said braid covered first tube, said braided reinforcement being applied such that it makes an angle of no more than about 45° with the axis of said first tube and rendering said polymeric material dimensionally heat unstable such that it is capable of changing dimension upon the application of heat alone to assume a predetermined configuration and a stable condition.

22. The process of claim 21 wherein said braid and second tube are applied so that said braid has freedom of movement between said tubes.

23. The process of claim 21 wherein said tubes are irradiated.

24. The process of claim 21 including the step of applying a fusible material to the inner surface of said first tube.

25. A heat recoverable article comprising an independently dimensionally heat unstable material which is capable of changing dimension upon the application of heat alone to assume a predetermined configuration and a heat unstable condition, a braided reinforcement which is coextensive with at least a portion of said material and will not undesirably interfere with radial change of said material, and an adhesive bonding said reinforcement to said material, having a low resistance to the movement of said reinforcement and having substantially no tendency to lose viscosity to a degree such that it would be squeezed out of said article at a temperature sufficient to cause said dimensionally heat unstable material to change dimension.

26. A process comprising applying a fluid adhesive to an independently dimensionally heat unstable material which is capable of changing dimension upon the application of heat alone to assume a predetermined configuration and a heat stable condition, applying a braided reinforcement to that portion of the dimensionally heat unstable material which is covered with adhesive and converting said adhesive to a binder which has substantially no tendency to lose viscosity to a degree such that it would be squeezed out of said article at a temperature sufficient to cause said dimensionally heat unstable materials to change dimension, thereby bonding said reinforcement to said dimensionally heat unstable material.

References Cited by the Examiner
UNITED STATES PATENTS

| | | | |
|---|---|---|---|
| 2,692,406 | 10/1954 | Rhodes et al. | 264—230 X |
| 2,781,552 | 2/1957 | Gray | 264—23 X |
| 2,932,065 | 4/1960 | Jenkins | 138—125 X |

LAVERNE D. GEIGER, Primary Examiner.

C. HOUCK, Examiner.